(12) United States Patent
Noll et al.

(10) Patent No.: US 6,513,543 B1
(45) Date of Patent: Feb. 4, 2003

(54) BACKFLOW PREVENTER VALVE

(75) Inventors: Brad L. Noll, Atascadero, CA (US); William M. Orr, Paso Robles, CA (US)

(73) Assignee: Zurn Industries, Inc., Erie, PA (US)

( * ) Notice: Subject to any disclaimer, the term of this patent is extended or adjusted under 35 U.S.C. 154(b) by 0 days.

(21) Appl. No.: 09/979,449

(22) PCT Filed: May 18, 2000

(86) PCT No.: PCT/US00/13688
§ 371 (c)(1),
(2), (4) Date: Nov. 14, 2001

(87) PCT Pub. No.: WO00/70246
PCT Pub. Date: Nov. 23, 2000

Related U.S. Application Data
(60) Provisional application No. 60/134,645, filed on May 18, 1999.

(51) Int. Cl.[7] .............................................. F16K 43/00
(52) U.S. Cl. ................. 137/315.11; 137/15.17; 137/315.33; 137/454.2; 137/512; 137/540; 137/614.2; 137/218
(58) Field of Search ....................... 137/15.17, 15.18, 137/218, 315.11, 315.18, 315.33, 454.2, 512, 527, 535, 540, 541, 542, 543, 613, 614.2, 454.5; 285/24

(56) References Cited

U.S. PATENT DOCUMENTS

| | | | | | |
|---|---|---|---|---|---|
| 4,232,704 | A | * | 11/1980 | Becker et al. | 137/512 |
| 4,284,097 | A | * | 8/1981 | Becker et al. | 137/218 |
| 4,429,903 | A | * | 2/1984 | Baker | 285/24 |
| 4,431,022 | A | * | 2/1984 | Ripert | 137/454.2 |
| 4,437,486 | A | * | 3/1984 | Bianchi | 137/454.2 |
| 4,991,622 | A | * | 2/1991 | Brewer et al. | 137/512 |
| 5,107,888 | A | * | 4/1992 | Dunmire | 137/512 |
| 5,226,441 | A | * | 7/1993 | Dunmire et al. | 137/512 |
| 5,385,166 | A | * | 1/1995 | Dunmire et al. | 137/512 |
| 5,404,905 | A | * | 4/1995 | Lauria | 137/312 |
| 5,503,176 | A | * | 4/1996 | Dunmire et al. | 137/512 |
| 6,021,805 | A | * | 2/2000 | Horne et al. | 137/512 |
| 6,325,090 | B1 | * | 12/2001 | Horne et al. | 137/512 |

* cited by examiner

Primary Examiner—George L. Walton
(74) Attorney, Agent, or Firm—Webb Ziesenheim Logsdon Orkin & Hanson, P.C.

(57) ABSTRACT

A fluid handling assembly that includes a modular strut removably secured to a valve that permits easy access to internal valve parts for repair and inspection.

20 Claims, 8 Drawing Sheets

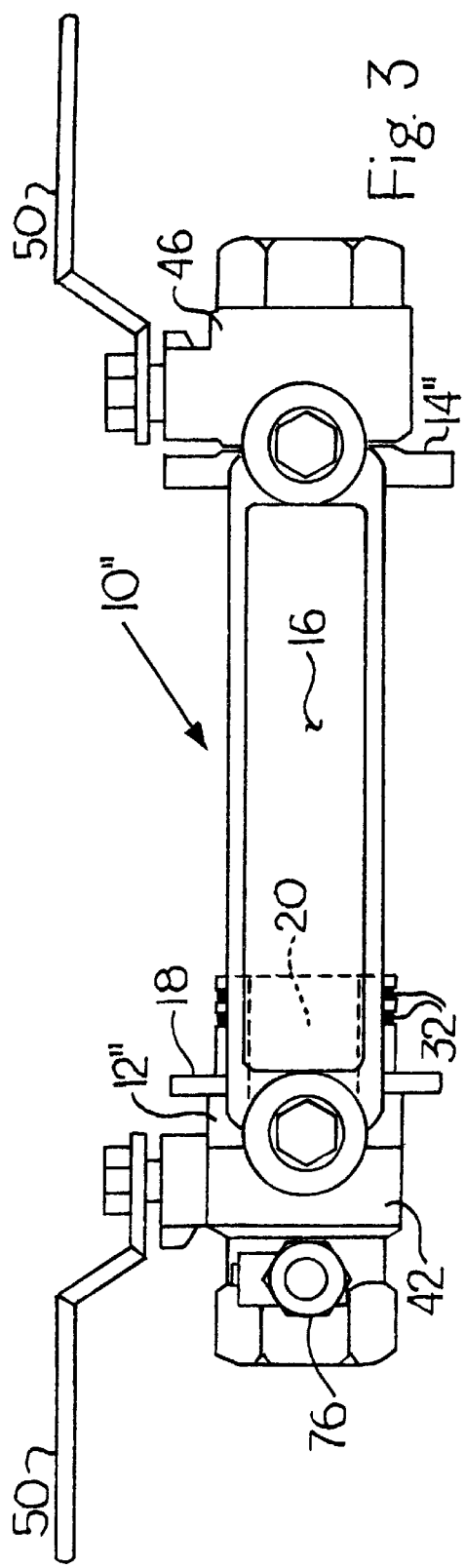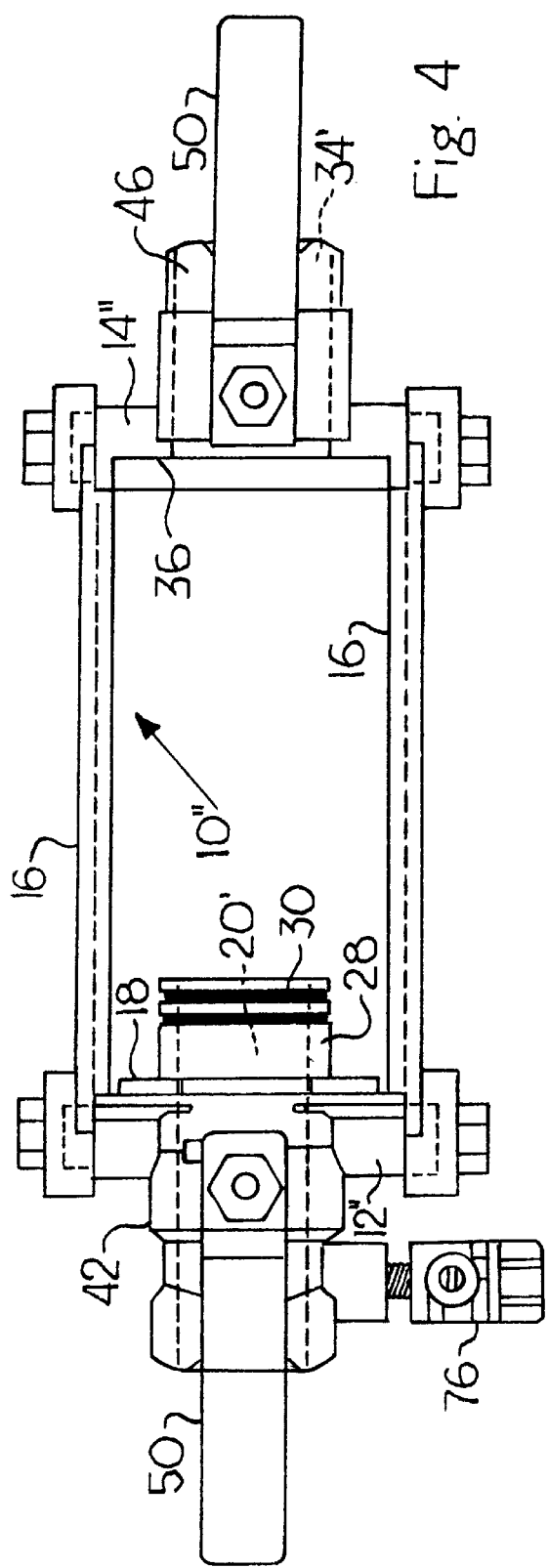

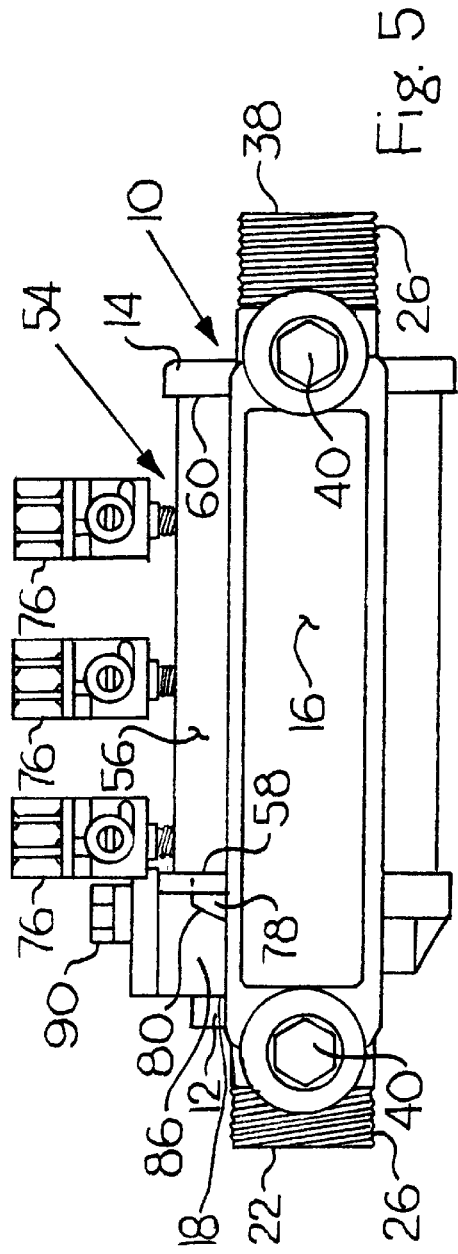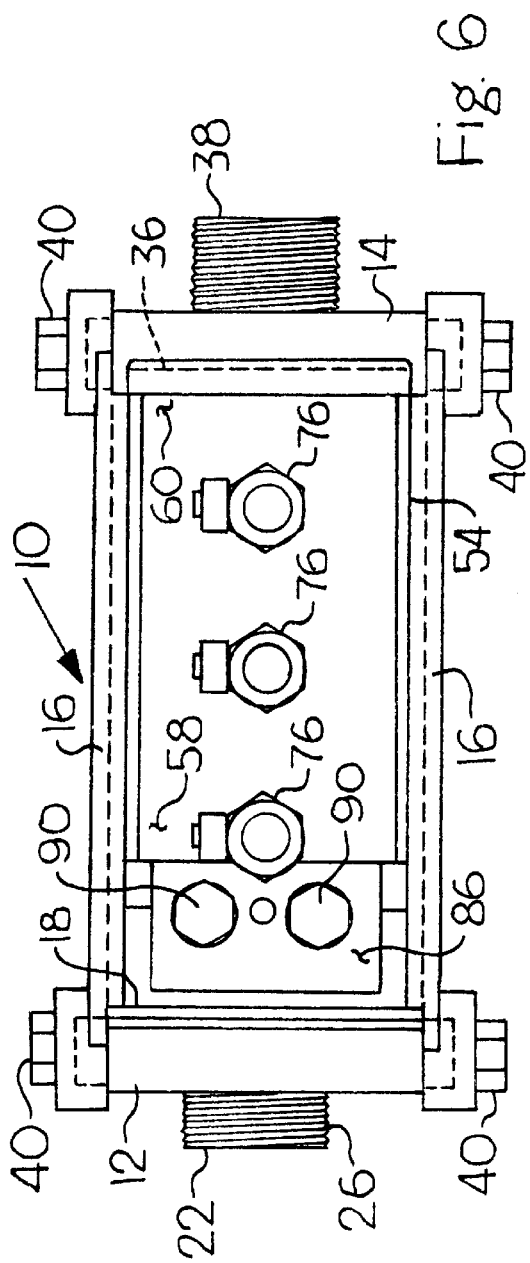

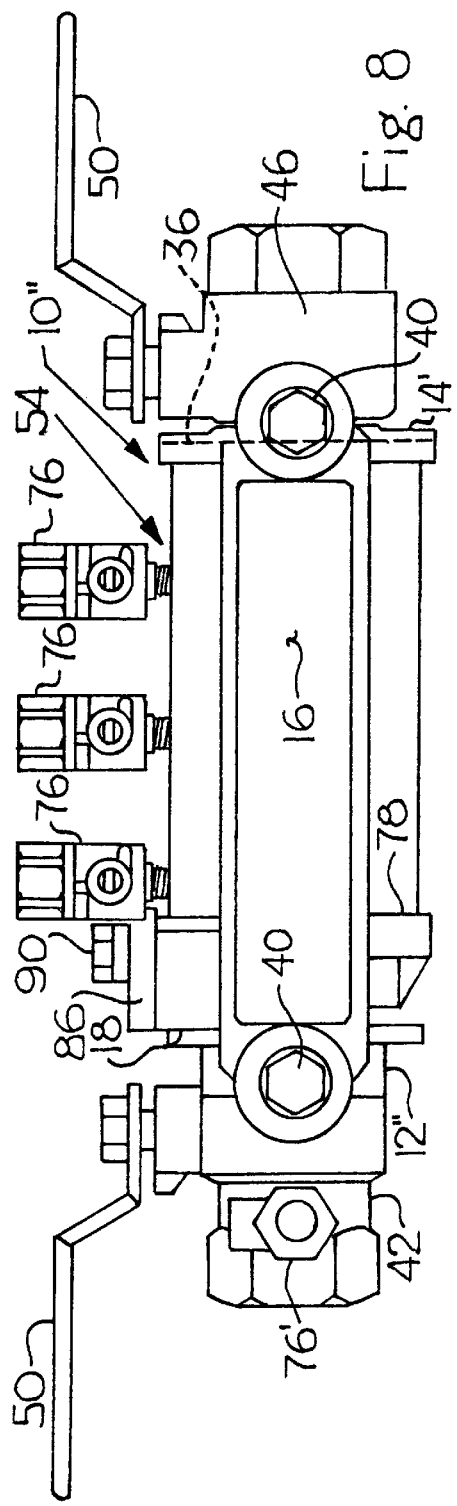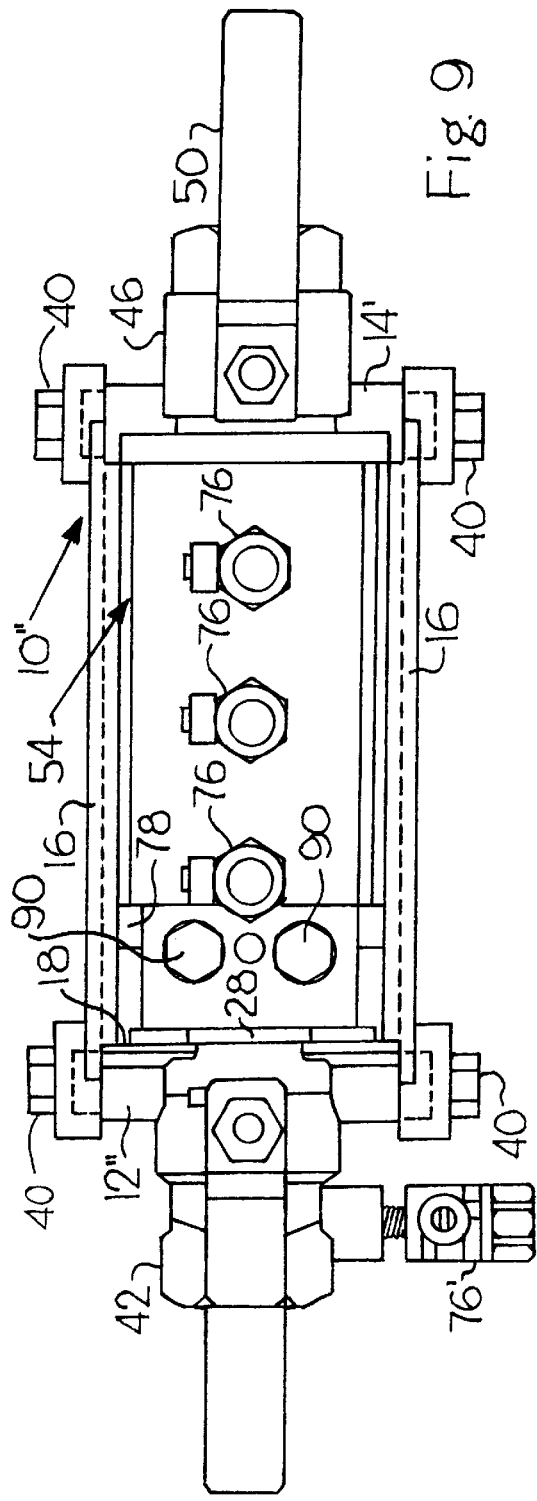

BACKFLOW PREVENTER VALVE

This Application claims the benefit of Prov. Appl. Ser. No. 60/134,645, filed May. 18, 1999.

BACKGROUND OF THE INVENTION

1. Field of the Invention

The present invention relates to a fluid handling assembly and, more particularly, to a fluid valve removably attached to a strut or setter assembly.

2. Brief Description of the Prior Art

Fluid valves generally each include a main body having two ends. The main body also forms an internal flow cavity that fluidly connects the two ends and houses internal valves. In a typical installation, one end of the main body is connected to a fluid inlet pipe and the other end is connected to a fluid outlet pipe. Fluid flows from the fluid inlet pipe, through the internal flow cavity, is stopped, directed, or left unimpeded by the internal valves, and exits through the fluid outlet pipe. Examples of fluid valves include backflow prevention valves (i.e., double check and reduced pressure principle valves), or other types of valves, such as those generally disclosed in U.S. Pat. Nos. 1,647,873; 2,586,942; 4,080,980; 4,357,954; 4,469,122; 4,893,654; 5,031,661; 5,226,441; 5,385,166; 5,404,905; and 5,503,176.

Some fluid valves have movable parts, such as independently acting internal reciprocating check valves, positioned in the internal flow cavity formed by a main body. An inlet shutoff valve, or some other member, as shown in U.S. Pat. Nos. 1,969,432; 3,245,257; 3,946,754; 4,327,760; 5,392,803; 5,511,574; and 5,732,744, is typically positioned adjacent one end of the main body, and an outlet shutoff valve is positioned adjacent the other end of the main body. In turn, each shutoff valve is connected, respectively, to the fluid inlet pipe or the fluid outlet pipe. The shutoff valves are required for testing and service of the backflow prevention valve.

Because the shutoff valves are historically connected to the fluid inlet and outlet pipes by male-female threaded connections, the fluid inlet and outlet pipes extend into each corresponding shutoff valve. Therefore, removing the main body means disrupting or cutting the fluid inlet and fluid outlet pipes. For this reason, the main body usually has access covers, which permit access to the internal components once the valve is installed.

There are, however, at least three related drawbacks to using access covers. First, access covers only provide limited access to the internalized parts, particularly since the access covers are smaller than the overall size of the main body. Second, because the main body is left in place during servicing or inspection, locating and reinstalling the access covers may be cumbersome, if not impossible, depending on the location of the main body with respect to other objects, such as neighboring plumbing or subfloors. Lastly, each time an access cover is removed, there is a risk that a faulty seal could develop during reinstallation, causing fluid leaks.

Therefore, it is an object of the present invention to allow removal of the main body of the fluid valve for repair, inspection, or replacement without requiring access covers and without disrupting adjacent piping.

SUMMARY OF THE INVENTION

The present invention generally includes a modular strut and a valve. The valve is removably connected to the modular strut, forming a fluid handling assembly.

The modular strut has an inlet body, an outlet body, and one or more spacers. The inlet body forms a force member receiving surface and a fluid inlet channel. The outlet body forms a fluid outlet channel and a valve body receiving surface. Each spacer is connected to the inlet body and the outlet body, separating the inlet body from the outlet body. The spacers are each removably connected to the inlet body and the outlet body by a fastener or, alternatively, each spacer is integrally formed with the inlet body and the outlet body. In this second instance, the spacers themselves can be removably connected to one another by a fastener.

The modular strut receives a removable valve to form the fluid handling assembly. The removable valve includes a valve body having a first end, a second end, and forming an internal flow channel. The removable valve is preferably not a stand-alone type of valve, so the modular strut provides the necessary connection fittings.

A mount, having a first mount surface, a second mount surface, and forming an orifice, is positioned between the first end of the valve body and the inlet body of the modular strut. A force member, positioned between the inlet body and the mount, holds the mount and the valve in place. With the force member installed, the second mount surface of the mount exerts force on the first end of the valve body. In turn, the first end of the valve body is fluidly sealed against the second mount surface of the mount, and the second end of the valve body is fluidly sealed against the valve body receiving surface formed by the outlet body.

One method of changing a valve that is part of a fluid handling assembly including a valve and a modular strut is described below. The modular strut has an inlet body, an outlet body, a pair of spacers adapted to connect the inlet body and the outlet body, a force member positioned adjacent to the inlet body and forming a third orifice, and a mount forming an internally-threaded orifice. The mount is positioned adjacent to the force member. An eternally-threaded member is threadedly received by the internally-threaded orifice in the mount. The method includes the steps of:

a. rotating the externally-threaded member in a first direction to loosen the eternally-threaded member;
b. removing the force member;
c. moving the mount in a direction toward the inlet body of the modular strut;
d. removing the valve from the modular strut;
e. inspecting the valve;
f. positioning the valve between the inlet body and the outlet body of the modular strut;
g. moving the mount in a direction toward the first end of the valve body;
h. positioning the force member between the inlet body of the modular strut and the mount; and
i. rotating the externally-threaded member in a second direction to tighten the eternally-threaded member.

When the force member and mount are removed, the valve can be removed from the modular strut for installation, replacement, or repair without significantly disrupting adjacent or attached piping. Moreover, because the valve is completely removable from the modular strut, an additional benefit is that access to internal valve components, such as reciprocating check valves in backflow prevention valves, is available without the need of separate access covers in the valve body.

In sum, the benefits of the present invention include the ability to quickly and easily gain access to the internal components of the valve body without the need for access covers.

These and other advantages of the present invention will be clarified in the Detailed Description of the Preferred Embodiments taken together with the attached drawings in which like reference numerals represent like elements throughout.

BRIEF DESCRIPTION OF THE DRAWINGS

FIG. 3 is a side elevational view of a third embodiment modular strut according to the present invention;

FIG. 4 is a top plan view of the modular strut shown in FIG. 3;

FIG. 5 is a side elevational view of a double check backflow prevention valve connected to the modular strut shown in FIG. 1;

FIG. 6 is a top plan view of the backflow prevention valve and modular strut shown in FIG. 5;

FIG. 8 is a side elevational view of a double check backflow prevention valve connected to the modular strut shown in FIGS. 3 and 4;

FIG. 9 is a top plan view of the backflow prevention valve and modular strut shown in FIG. 8;

DETAILED DESCRIPTION OF THE PREFERRED EMBODIMENTS

Figure 1:
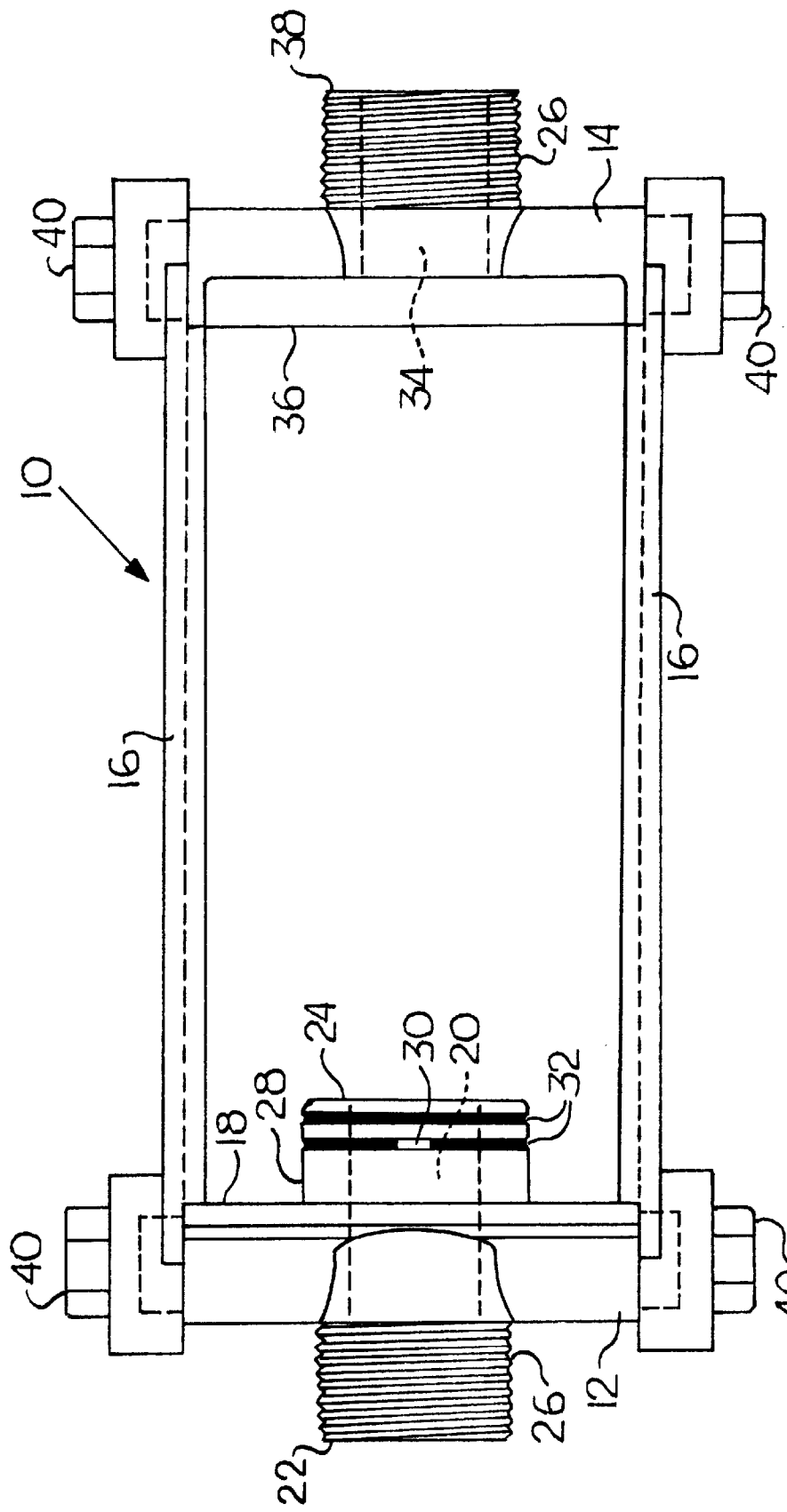
FIG. 1 is a top plan view of a first embodiment modular strut according to the present invention.
Figure 2:
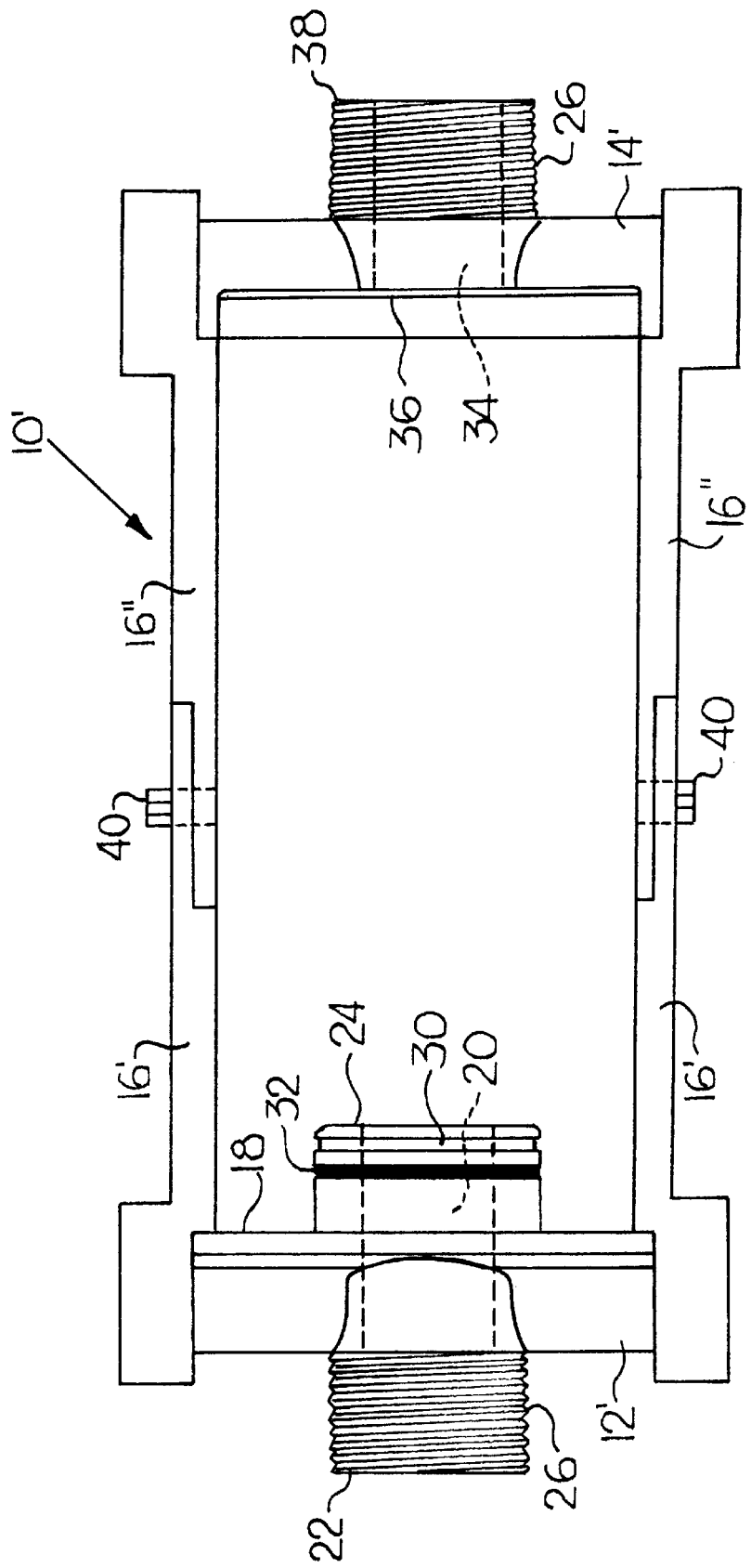
FIG. 2 is top plan view of a second embodiment modular strut according to the present invention.
Figure 7:
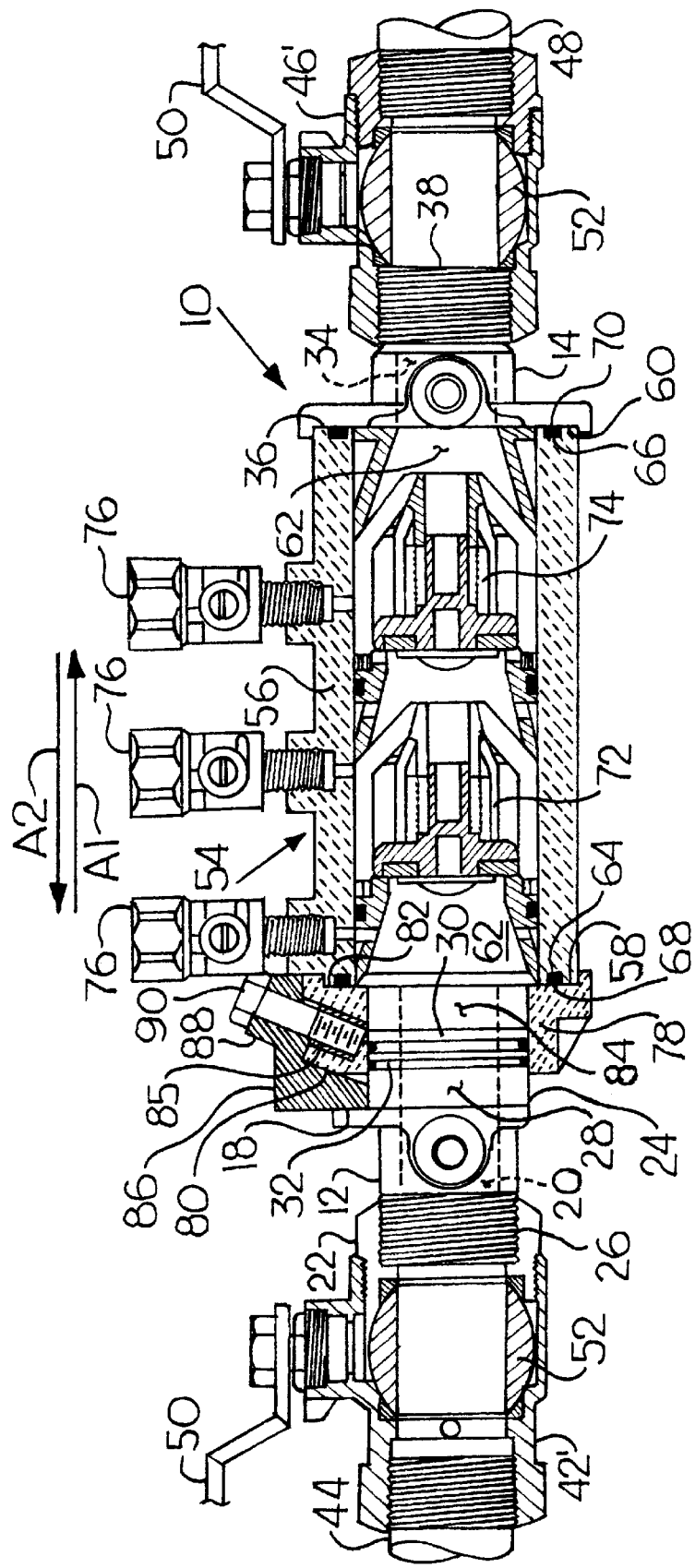
FIG. 7 is a partial sectional view of the backflow prevention valve and modular strut shown in FIGS. 5 and 6 with a first shutoff valve positioned adjacent to an inlet body and a second shutoff valve positioned adjacent to an outlet body.
Figure 10:
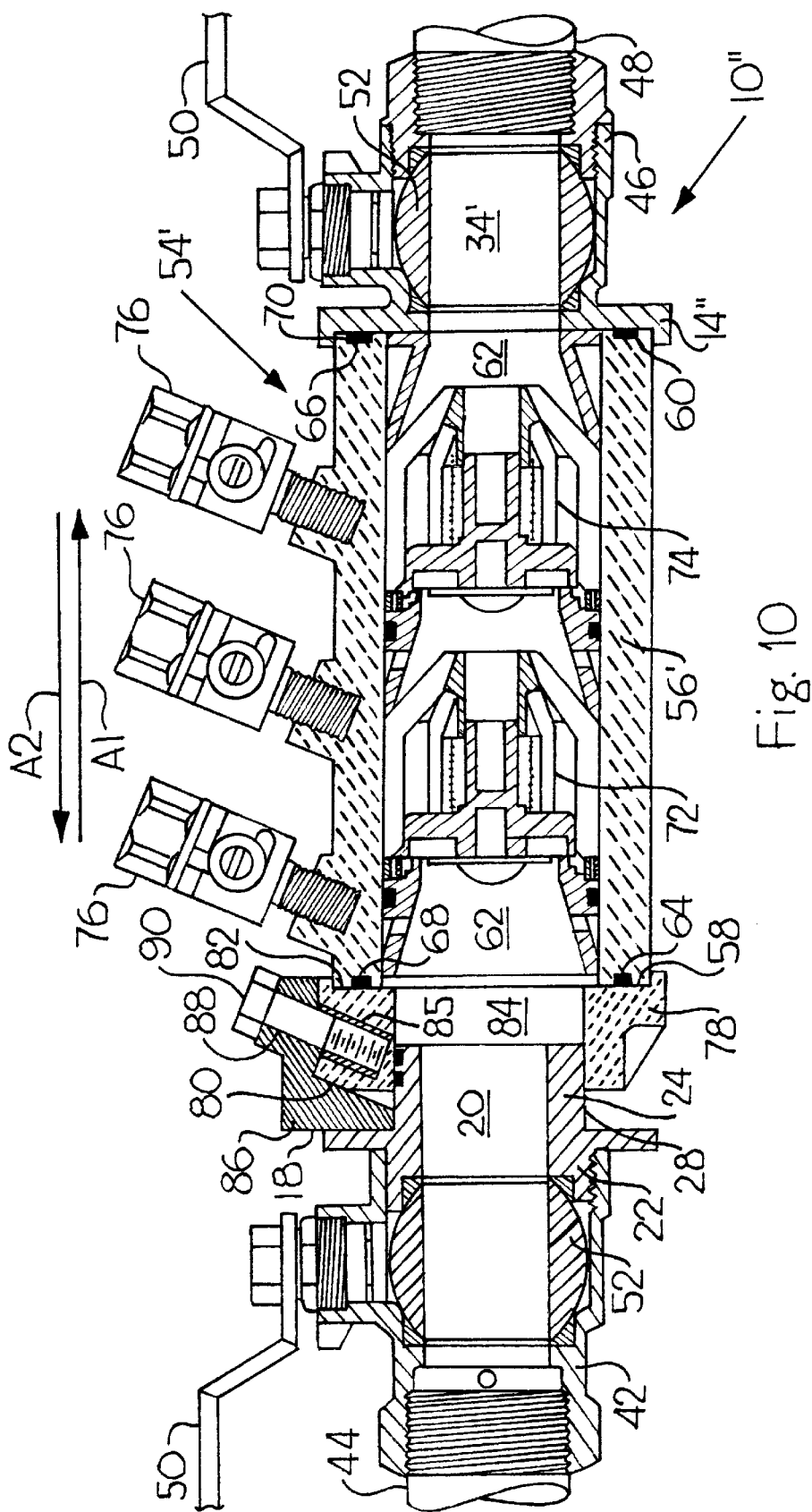
FIG. 10 is a partial sectional view of the backflow prevention valve and modular strut shown in FIGS. 3 and 4, with taps angled with respect to the backflow prevention valve.
Figure 11:
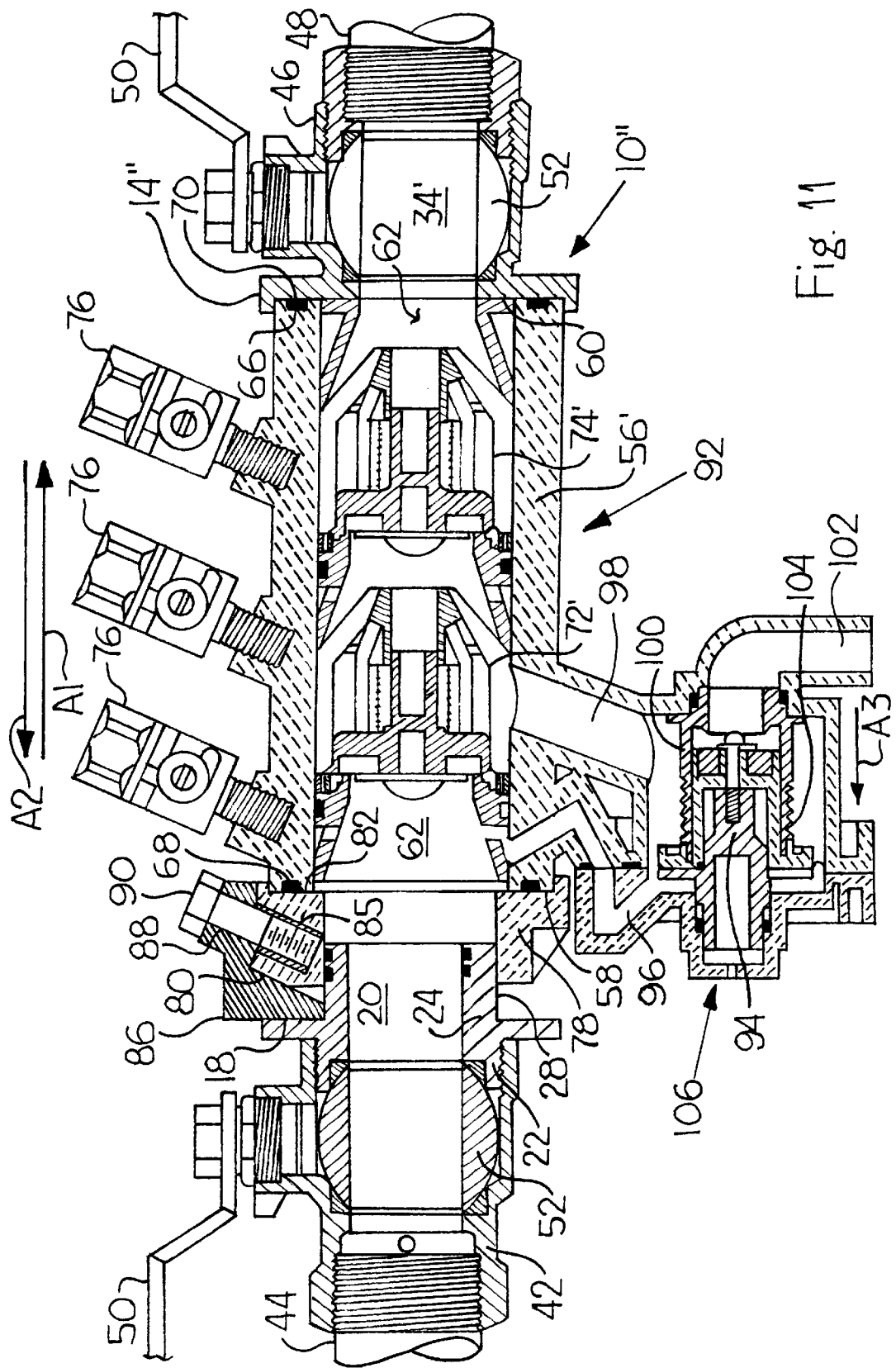
FIG. 11 is a partial sectional view of a partial reduced pressure principle valve connected to the modular strut shown in FIG. 3.

A first embodiment of a modular strut according to the present invention is shown in FIG. 1. A second embodiment of a modular strut is shown in FIG. 2. A third embodiment of a modular strut is shown in FIGS. 3–4. FIGS. 5–7 show a first embodiment double check backflow prevention valve removably attached to the modular strut shown in FIG. 1. FIGS. 8–9 show the first embodiment backflow prevention valve removably attached to the modular strut shown in FIG. 3. FIG. 10 shows a second embodiment backflow prevention valve removably attached to the modular strut shown in FIG. 3. FIG. 11 shows a partial reduced pressure principle valve removably attached to the modular strut shown in FIG. 3. Each of the modular strut embodiments and each of the valve bodies are preferably made from plastic, metal, or other suitable material.

Referring to FIG. 1, a first embodiment of a modular strut 10 has an inlet body 12, an outlet body 14, and one or more spacers 16, with a pair of spacers 16 preferred. The inlet body 12 forms a force member receiving surface 18, a fluid inlet channel 20, a first connector 22, and a second connector 24. The first connector 22 preferably forms external threads 26. The second connector 24 has an external surface 28 forming a second connector recess 30. A sealing member 32, preferably an O-ring made from rubber or other suitable material, is received in the second connector recess 30.

The outlet body 14 forms a fluid outlet channel 34, a valve body receiving surface 36, and a third connector 38. Like the first connector 22, the third connector 38 also preferably forms external threads 26.

The pair of spacers 16 are each removably connected to the inlet body 12 and the outlet body 14 by fasteners 40, such as bolts. The pair of spacers 16 separate the inlet body 12 from the outlet body 14, retarding movement of the inlet body 12 and the outlet body 14 with respect to one another.

As shown in FIG. 2 and with continuing reference to FIG. 1, the second embodiment of the modular strut 10" includes portions of spacers 16', 16" integrally formed with the inlet body 12' and the outlet body 14'. Corresponding spacer portions 16', 16" are removably connected to one another by a fastener 40, such as a bolt.

As shown in FIGS. 3 and 4 and with continuing reference to FIGS. 1 and 2, the third embodiment of the modular strut 10" has an inlet body 12" forming a fluid inlet channel 20' and a fluid outlet body 14" forming a fluid outlet channel 34'. In this particular embodiment, a first shutoff valve 42 is integrally formed with the inlet body 12" and a second shutoff valve 46, having a handle 50 and a ball 52 (FIGS. 10 and 11), is integrally formed with the outlet body 14".

As shown in FIGS. 5 and 6, a valve, preferably a backflow prevention valve 54, is removably connected to the inlet body 12 and the outlet body 14 of the modular strut 10 shown in FIG. 1, forming a fluid handling assembly. As shown in more detail in FIG. 7, the backflow prevention valve 54 includes a valve body 56 having a first end 58, a second end 60, and forming an internal flow channel 62 extending between the first end 58 of the valve body 56 and the second end 60 of the valve body 56. The first end 58 of the valve body 56 forms a first sealing member recess 64 and the second end 60 of the valve body 56 forms a second sealing member recess 66. A first valve body sealing member 68 is seated in the first sealing member recess 64, and a second valve body sealing member 70 is seated in the second sealing member recess 66. A first spring-loaded reciprocating valve or check valve 72 and a second reciprocating spring-loaded valve or check valve 74 are positioned in the internal flow channel 62 of the valve body 56. Other types of check valves may be used. Taps 76 are positioned along the valve body 56 and are in fluid communication with the internal flow channel of the valve body 56. These taps 76 are adapted to be secured to flush lines and/or pressure gauges (not shown). A first shutoff valve 42' is preferably positioned adjacent to the first connector 22. A first fluid conduit 44 is connected to the first shutoff valve 42'. A second shutoff valve 46' is positioned adjacent the outlet body 14 and a second fluid conduit 48 is positioned adjacent to the second shutoff valve 46'. The shutoff valves 42', 46' are preferably ball valves, wherein each ball valve includes a handle 50 that can position an attached ball 52 in an open and closed position. However, valves other than ball valves may be used.

As shown in FIGS. 5–7, a mount 78 is positioned between the first end 58 of the valve body 56 and the inlet body 12 of the modular strut 10. As shown in detail in FIG. 7, the mount 78 has a first mount surface 80, a second mount surface 82, and forms a first orifice 84 and an internally-threaded orifice 85. A force member 86 is positioned between the inlet body 12 of the modular strut 10 and the mount 78. The force member 86 forms an angled surface opposite the force member receiving surface 18 and adjacent the first mount surface 80. The force member 86 also abuts against the force member receiving surface 18. The force member 86 further forms a third orifice 88 which is aligned with the internally-threaded orifice 85 formed by the mount 78. The internally-threaded orifice 85 and the third orifice 88 receive an eternally-threaded member 90, such as a screw, bolt, or other suitable device.

FIGS. 8 and 9 show the backflow prevention valve 54 removably attached to the modular strut 10" shown in FIG. 3. A tap 76' is provided on the first shutoff valve 42. FIG. 10 shows a second embodiment backflow prevention valve 54' removably attached to the modular strut 10" shown in FIG. 3. With respect to the embodiment shown in FIGS. 8 and 9, like reference numerals indicate like parts. The second embodiment backflow prevention valve 54' has a valve body 56' forming angled tap 76 orifices with respect to the valve body 56'.

FIG. 11 shows a reduced pressure principle valve 92 removably attached to the modular strut 10" shown in FIG. 3. The reduced pressure principle valve 92 is similar to the double check valve 54, 54' except that the pressure drop across the first check valve 72' is between 7 and 10 psi as opposed to 1 psi in the first check valve 72 in the double check valve 54, 54'. Moreover, the reduced pressure principle valve 92 incorporates a hydraulically-controlled pressure relief valve 106. The relief valve 106 senses the pressure across the first check valve 72'. If the first check valve 72' becomes fouled with sand, dirt, or other solids, the pressure drop across the first check valve 72' is equal on a first side 96 and a second side 98 of the relief valve 106. The relief valve piston 94, biased by spring 104, causes the relief valve piston 94 to move in the direction of arrow A3 so that fluid passes through the seat 100 and exits through the outlet 102.

The following describes the operation of all of the embodiments of the present invention. However, for clarity, only reference numerals related to the backflow prevention valve 54 removably connected to the first embodiment of the modular strut 10 shown in FIG. 7 will be referred to unless otherwise indicated.

In operation, as shown in FIG. 7, the inlet body 12 of the modular strut 10 and the outlet body 14 of the modular strut 10 are secured, respectively, to the first fluid conduit 44 and the second fluid conduit 48 through the respective shutoff valves 42, 46'. The handles 50 of the shutoff valves 42, 46' are positioned in-line so that the balls 52 of the shutoff valves 42, 46' are in an open position. This permits a fluid, such as water, to flow through the valve body 56 in a first direction, as indicated by arrow A1. Fluid flow in direction A1 causes the first and second check valves 72, 74 to move in direction A1, permitting fluid to flow through the valve body 56. Should fluid flow in a second direction, indicated by arrow A2, the check valves 72, 74 are urged or moved in the second direction A2 and form a fluid seal, thereby preventing the flow of fluid through the valve body 56.

Periodically, the internal components of a backflow prevention valve 54, such as check valves 72, 74, must be inspected. In this manner, the handles 50 are rotated 90° so as to stop the flow through the shutoff valves 42, 46'. The externally-threaded member 90 is loosened by unscrewing the externally-threaded member 90, such as by rotating the externally-threaded member 90 in a first or counterclockwise direction. As the externally-threaded member 90 is unscrewed, the externally-threaded member 90 ceases to engage the internally-threaded orifice 85 in the mount 78, allowing the force member 86 and the externally-threaded member 90 to be removed. The mount 78 is slid in the second direction A2 and the valve body 56 is removed from the modular strut 10. The first and second check valves 72, 74 can then be easily inspected and access to the first and second check valves 72, 74 can be obtained through the first and second ends 58, 60 of the valve body 56. After inspection and/or replacement of the appropriate components is complete, the valve body 56 is then returned to the modular strut 10, and is moved in the direction of arrow A1. The mount 78 is positioned adjacent the first end 58 of the valve body 56 and also moves in the direction of arrow A1. The force member 86 is replaced. The externally-threaded member 90 is inserted through the third orifice 88 formed by the force member 86 and is threadedly received by the internally-threaded orifice 85 formed by the mount 78. The externally-threaded member 90 is then tightened, such as by rotating the externally-threaded member 90 in a second or clockwise direction. This causes a wedging action between respective angled surfaces of the force member 86 and the mount 78 which, in turn, forces the mount 78 against the valve body 56.

With force member 86 securely in place, the second mount surface 82 of the mount 78 exerts force on the first end 58 of the valve body 56, compressing the first valve body sealing member 68 and fluidly sealing the first end 58 of the valve body 56 against the second mount surface 82 of the mount 78. At the same time, the second valve body sealing member 70 is also compressed, fluidly sealing the second end 60 of the valve body 56 against the valve body receiving surface 36 formed by the outlet body 14. Finally, the first orifice 84 formed by the mount 78 receives the second connector 24, forming a fluid seal between the inlet body 12 and the second connector 24 through sealing members 32.

The handles 50 are then rotated 90° so that they are arranged in-line to permit fluid to flow through the backflow prevention valve 54 as previously described.

As should now be evident, the present invention enables quick and easy access to the internal components of the double check valve 54 and the reduced pressure principle valve 92, whereas conventional fluid valves have extremely small access ports that are difficult to work on when the valve is installed. The present invention is particularly useful with the repair and testing of the double check valve 54 and the reduced pressure principle valves 92. The modular strut can include shutoff valves 42, 46 integral with the inlet body 12 or the outlet body 14 as shown in FIGS. 3, 4, and 8–11 or an arrangement where the shutoff valves 42, 46' are separate from the inlet body 12 and outlet body 14, as shown in FIG. 7. The modular strut 10 can also be used with other types of pressure vessels, flow members or bodies, such as water meter bodies, conduits, or other valve bodies, and need not be limited to double check valves 54 and reduced pressure principle valves 92.

The invention has been described with reference to the preferred embodiments. Obvious modifications and alterations will occur to others upon reading and understanding the preceding Detailed Description. It is intended that the invention be construed as including all such modifications and alterations insofar as they come within the scope of the appended claims or the equivalents thereof.

We claim:

1. A modular strut for receiving a removable valve to form a fluid handling assembly, the valve having a valve body forming a fluid channel having a first end and a second end, said modular strut comprising:

an inlet body forming a fluid inlet channel and a force member receiving surface;

an outlet body forming a fluid outlet channel and a valve body receiving surface for receiving said second end of said valve body;

a pair of spacers adapted to be positioned external to the fluid channel, each of said pair of spacers having a first end a second end, said first end of each of said pair of spacers is connected to said inlet body and said second end of each of said pair of spacers is connected to said outlet body, wherein said pair of spacers separates said inlet body from said outlet body so that the removable valve can be received between said inlet body and said outlet body;

a mount forming a first mount surface, a second mount surface, a first orifice, and an internally-threaded orifice;

a force member forming a third orifice; and an externally-threaded member threadedly received by said internally-threaded orifice of said mount and said third orifice in said force member, wherein said second mount surface of said mount is adapted to be positioned adjacent the first end of the removable valve body, and said force member is positioned between said first mount surface of said mount and said force member receiving surface of said inlet body.

2. The modular strut as claimed in claim 1 wherein said inlet body forms a first connector and a second connector defining a second connector recess, said first connector is adapted to connect said inlet body to a first fluid conduit and said second connector engaging said first orifice in said mount.

3. The modular strut as claimed in claim 2 further comprising a sealing member seated in said second connector recess for providing a fluid seal between said second connector and said mount.

4. The modular strut as claimed in claim 1 wherein said inlet body and said outlet body further include an integrally formed shutoff valve.

5. The modular strut as claimed in claim 1 wherein said spacers are removably connected to said inlet body and said outlet body.

6. The modular strut as claimed in claim 1 wherein said spacers are integrally formed with said inlet body and said outlet body.

7. The modular strut as claimed in claim 1 wherein said outlet body forms a third connector adapted to connect said modular strut to a second fluid conduit.

8. A fluid handling assembly comprising:

a modular strut comprising:
an inlet body having a force member receiving surface and forming a fluid inlet channel;
an outlet body forming a fluid outlet channel and a valve body receiving surface;
a pair of spacers, each of said pair of spacers having a first end a second end, said first end of each of said pair of spacers is connected to said inlet body and said second end of each of said pair of spacers is connected to said outlet body, wherein said pair of spacers separates said inlet body from said outlet body;
a force member positioned adjacent said inlet body, said force member forming a third orifice;
a mount positioned adjacent said force member, said mount forming a first mount surface, a second mount surface, a first orifice, and an externally-threaded orifice; and
an externally-threaded member received by said internally-threaded orifice formed in said mount and said third orifice in said force member, and a valve, said valve comprising:
a removable valve body, said valve body having a first end, a second end, and forming an internal flow channel, wherein said second mount surface of said mount is positioned adjacent said first end of said valve body and said second end of said valve body contacting said valve body receiving surface, whereby said pair of spacers are positioned external of said internal flow channel.

9. The fluid handling assembly as claimed in claim 8 wherein said valve is a double check valve having a valve body forming an internal flow channel.

10. The fluid handling assembly as claimed in claim 8 wherein said valve is a reduced pressure principle valve having a valve body forming an internal flow channel.

11. The fluid handling assembly as claimed in claim 8 wherein said inlet body forms a first connector and a second connector defining a second connector recess, said first connector for connecting said modular strut to a first fluid conduit and said second connector for engaging said orifice in said mount.

12. The fluid handling assembly as claimed in claim 8 wherein said outlet body further includes an integrally formed shutoff valve.

13. The fluid handling assembly as claimed in claim 8 further comprising a check valve positioned in said internal flow channel of said valve body.

14. The fluid handling assembly as claimed in claim 9 further comprising a check valve positioned in said internal flow channel of said valve body.

15. The fluid handling assembly as claimed in claim 10 wherein said modular strut and said valve body are plastic.

16. A method of changing a valve that is part of a fluid handling assembly including said valve and a modular strut, said modular strut having an inlet body, an outlet body, a pair of spacers each of said pair of spacers having a first end a second end, said first end of each of said pair of spacers is connected to said inlet body and said second end of each of said pair of spacers is connected to said outlet body, a force member positioned adjacent said inlet body, said force member forming a third orifice, a mount forming an internally-threaded orifice, said mount positioned adjacent said force member, and an externally-threaded member threadedly received by said internally-threaded orifice in said mount, comprising the steps of:

rotating said externally-threaded member in a first direction to loosen said externally-threaded member;

removing said force member;

moving said mount in a direction toward said inlet body of said modular strut; and removing said valve from said modular strut.

17. The method of changing a valve as claimed in claim 16 further comprising the step of inspecting said valve.

18. The method of changing a valve as claimed in claim 16 further comprising the steps of:

positioning said valve between said inlet body and said outlet body of said modular strut;

moving said mount in a direction toward said first end of said valve body;

positioning said force member between said inlet body of said modular strut and said mount; and rotating said externally-threaded member in a second direction to tighten said externally-threaded member.

19. The method of changing a valve as claimed in claim 17 further comprising the steps of:

positioning said valve body between said inlet body and said outlet body of said modular strut;

moving said mount in a direction toward said first end of said valve body;

positioning said force member between said inlet body of said modular strut and said mount; and rotating said externally-threaded member in a second direction to tighten said externally-threaded member.

20. A fluid handling assembly comprising:

a modular strut comprising:

an inlet body having a force member receiving surface and forming a fluid inlet channel;

an outlet body forming a fluid outlet channel and a flow member body receiving surface;

a pair of spacers, each of said pair of spacers having a first end a second end, said first end of each said pair of spacers is connected to said inlet body and said second end of each of said pair of spacers is connected to said outlet body, wherein said pair of spacers separates said inlet body from said outlet body;

a force member positioned adjacent said inlet body, said force member forming a third orifice;

a mount positioned adjacent said force member, said mount forming a first mount surface, a second mount surface, a first orifice, and an internally-threaded orifice; and an externally-threaded member received by said internally-threaded orifice formed in said mount and said third orifice in said force member, and a flow member, said flow member comprising:

a flow member body, said flow member body having a first end, a second end, and forming an internal flow channel, wherein said second mount surface of said mount is positioned adjacent said first end of said flow member body and said second end of said flow member body contacting said flow member body receiving surface, said flow member removably secured to said modular strut, and wherein said pair of spacers are positioned external of said internal flow channel.

* * * * *

UNITED STATES PATENT AND TRADEMARK OFFICE
CERTIFICATE OF CORRECTION

PATENT NO.    : 6,513,543 B1
DATED         : February 4, 2003
INVENTOR(S)   : Brad L. Noll et al.

It is certified that error appears in the above-identified patent and that said Letters Patent is hereby corrected as shown below:

Column 2,
Lines 35-36, 40 and 54, "eternally-threaded" should read -- externally-threaded --.

Column 4,
Line 11, "strut 10" includes" should read -- strut 10' includes --.

Column 5,
Line 4, "eternally-threaded" should read -- externally-threaded --.

Column 7,
Line 53, "first end a second" should read -- first end and a second --.

Column 8,
Line 35, "first end a second" should read -- first end and a second --.

Column 9,
Lines 14-15, "first end a second" should read -- first end and a second --.

Signed and Sealed this

Twenty-fourth Day of June, 2003

JAMES E. ROGAN
*Director of the United States Patent and Trademark Office*